Dec. 1, 1964  R. NEUSCHOTZ  3,159,074
POLYGONAL THREADED INSERTS
Filed April 4, 1961  2 Sheets-Sheet 1
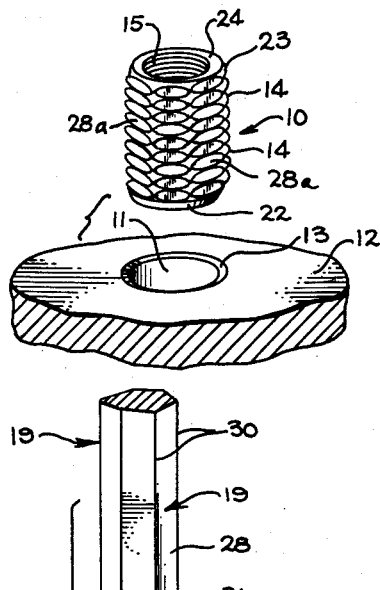
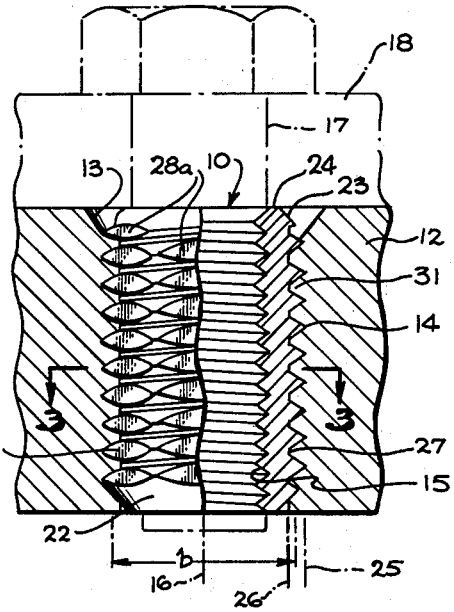
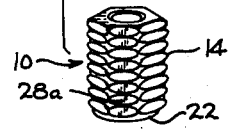
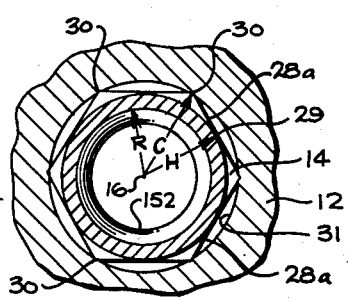
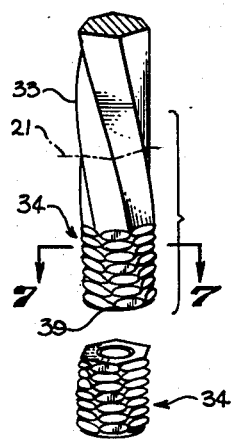
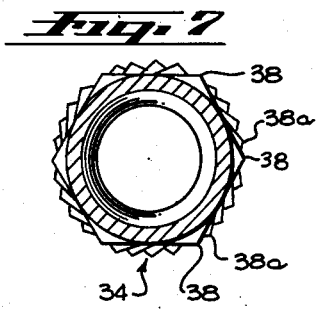
INVENTOR.
ROBERT NEUSCHOTZ
BY
William P. Green
ATTORNEY Dec. 1, 1964  R. NEUSCHOTZ  3,159,074
POLYGONAL THREADED INSERTS
Filed April 4, 1961  2 Sheets-Sheet 2
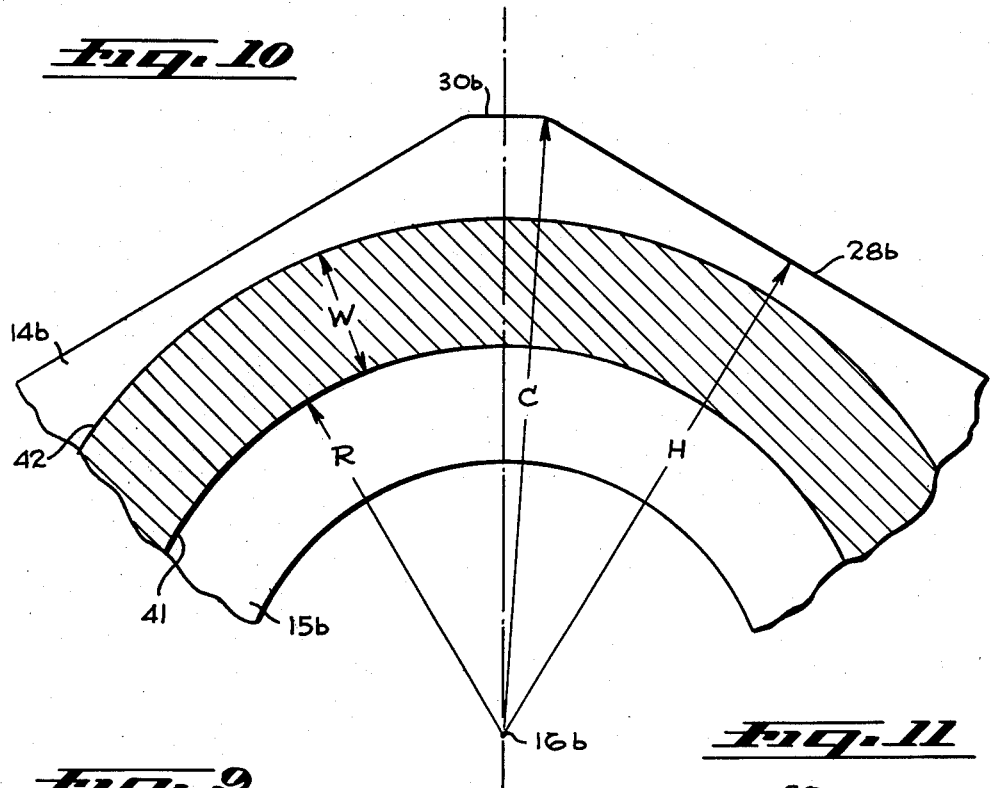
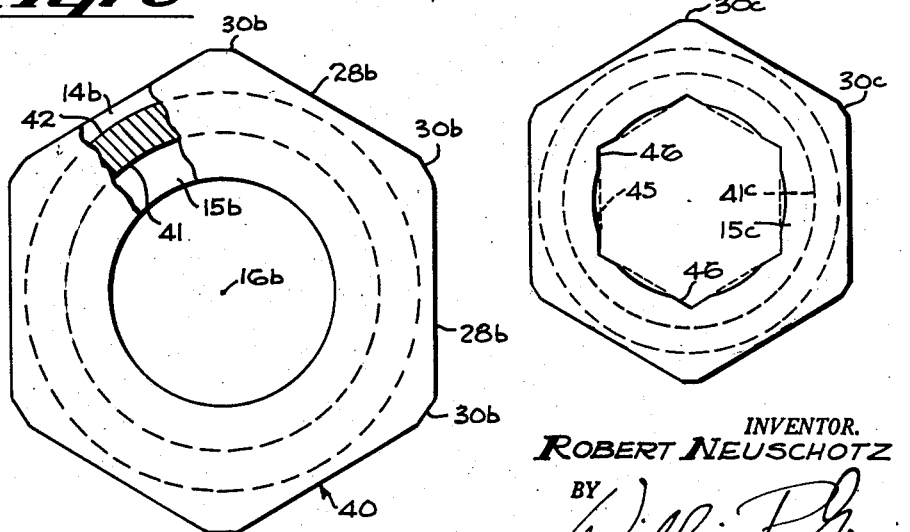
INVENTOR.
ROBERT NEUSCHOTZ
BY
William P. Green
ATTORNEY

United States Patent Office 3,159,074
Patented Dec. 1, 1964

3,159,074
POLYGONAL THREADED INSERTS
Robert Neuschotz, 1162 Angelo Drive,
Beverly Hills, Calif.
Filed Apr. 4, 1961, Ser. No. 100,697
5 Claims. (Cl. 85—47)

This invention relates to improved self-tapping threaded inserts, adapted to be screwed into and tap threads within an initially unthreaded bore, and designed to be used for attaching a stud or bolt to a carrier part into which the insert is to be screwed. The present application is a continuation-in-part of my copending application Serial Number 806,371 now abandoned, filed April 14, 1959 on "Self-Tapping Threaded Element." Also, certain features of a method novelty residing in the preferred manner of forming the insert of the present invention are disclosed and claimed in my copending application Serial Number 25,169, filed April 11, 1960 on "Method of Forming a Self-Tapping Threaded Element."

A major object of the invention is to provide a self-tapping insert of the above discussed type which is much simpler in construction than prior devices intended for the same purpose, and therefore is extremely inexpensive to manufacture. At the same time, it is an object of the invention to so form the insert that its effectiveness in tapping threads in an initially unthreaded bore, as well as its effectiveness in resisting removal from the bore and transmitting load forces from a coacting stud to the carrier part into which the insert is screwed, will actually be superior in many respects to conventional inserts designed for the same purpose.

An insert embodying the invention consists of a generally tubular insert body having external threads for engaging a carrier part into which the insert is to be screwed, and having internal threads into which the associated stud or bolt is to be connected. The external cross sectional configuration of the insert body, except as that cross sectional shape is interrupted by the external threads, takes the form essentially of a polygon, with the polygon desirably having 5, 6 or 7 sides. Preferably, the polygon is a "regular" polygon, and in the arrangement which has proven most effective to date, it has 6 sides. In accordance with the method of manufacture taught and claimed in the above mentioned copending application Serial Number 25,169, the threaded externally polygonal insert may be formed by starting with an elongated piece of bar or tubular stock of the desired polygonal transverse cross section, and then threading that non-circular stock externally and internally.

To define more specifically the actual structure of the ultimate insert embodying the invention, the polygonal external cross section of the insert is such as to form on the external threads a series of circularly successive outer surfaces, defining radially outwardly projecting peaks at the junctures of these surfaces. These radially outwardly facing outer surfaces of the external threads are planar along the major portion of the extent of a particular surface from one peak to the next peak. The external threads, which preferably have a uniform minor diameter, are then of maximum radial thickness at the peak locations, and are truncated progressively between successive peaks by the mentioned outer planar surfaces, so that as a particular thread extends circularly from one peak to the next, the thread first reduces and then increases in radial thickness.

When an insert of this type is screwed into an unthreaded bore, to tap threads in that bore, the insert is usually screwed into position by means of a tool having a threaded stud which projects into and engages the internal threads of the insert. This tool is turned in a manner to drive the insert body rotatively, so that the peaks formed on the outer essentially polygonal threads of the insert act to progressively form internal threads in the bore into which the device is being screwed. By virtue of the unique configuration of the outer surfaces formed on the external threads, which outer surfaces define the peaks for performing the self-tapping action, the threads tapped by the insert in the carrier part are formed by an effective cold working type of action, in which the material being threaded is actually deformed or cold worked to the desired thread shape, rather than being cut, with the result that the threads have the increased strength which inherently results from such cold working. The forced advancement of the thread forming peaks through the material of the outer carrier part of course offers substantial resistance to the turning of the insert body by the driving tool which engages its internal threads. Also, the engagement of the peaks on the insert body with the carrier part in the final installed condition offers very substantial resistance to unscrewing of the insert from the carrier part, and effectively retains the insert in its installed position.

In actually constructing inserts of the above discussed novel type, it has been found that certain relationships between the dimensions of the internal threads and the external polygonal thread structure are highly critical, in order to enable the insert to be properly screwed into an initially untapped bore by means of a driving tool, without breaking either the tool or the insert wall, while at the same time assuring the provision of peaks having sufficient size, relative to the rest of the insert, to effectively retain the insert in the outer carrier member after installation. Of prime importance in this connection is a unique relationship between the radius of the major diameter portions of the internal threads, and the minimum radial distance from the axis of the insert to the outer flat or planar surfaces which truncate the external threads. More particularly, the first of these two dimensions should be equal to between about 67% and 80% of the second dimension. Also, as will be brought out at a later point, there are certain additional highly important relationships which are preferably maintained between various dimensions, including the maximum radial dimension of the insert at the peak location, and the radial wall thickness dimension between the major diameter of the internal threads and the minor diameter of the external threads.

Certain further features of the invention reside in a form of the invention in which the externally polygonal bar stock is initially twisted prior to the threading operation, so that the circularly spaced peaks formed by any one particular turn of the external threads are not axially aligned with the corresponding peaks formed on others of the threads, with resultant increased resistance being offered to axial withdrawal of the insert element from a part into which it has been screwed.

The above and other features and objects of the present invention will be better understood from the following detailed description of the typical embodiments illustrated in the accompanying drawing, in which:

FIG. 1 is a perspective view representing a self-tapping threaded insert constructed in accordance with the invention, and showing a part into which the insert is to be screwed;

FIG. 2 is an enlarged partially sectional view showing the insert of FIG. 1 as it appears after being screwed into the outer carrier part;

FIG. 3 is a transverse section taken on line 3—3 of FIG. 2;

FIG. 4 is an enlarged fragmentary section showing one of the projections of the insert;

FIG. 5 is a view representing the method of manufacture of the insert shown in FIGS. 1 through 4;

FIG. 6 shows a method of manufacturing a variational form of insert embodying the invention;

FIG. 7 is an enlarged transverse section taken on line 7—7 of FIG. 6;

FIG. 8 is a view further representing the method of manufacture of the insert shown in FIGS. 6 and 7;

FIG. 9 is an enlarged end view of a further slightly variational form of the insert embodying the invention;

FIG. 10 is a greatly enlarged fragmentary representation of the configuration of the FIG. 9 insert at the location of one of its peaks; and FIG. 11 is a view similar to FIG. 9, but showing another form of the invention.

Referring first to FIG. 1, I have shown at 10 a self-tapping threaded insert which is to be screwed into an initially unthreaded cylindrical bore 11 formed in a carrier part 12. Part 12 may typically be formed of aluminum or another metal, or in some cases of a resinous plastic material. The bore 11 may have at its upper end a short frusto-conical countersink portion 13.

Insert 10 is essentially tubular in configuration, and has external threads 14 formed along its outer surface for tapping threads into bore 11 as part 10 is screwed thereinto. The exact configuration of threads 14 will be discussed in detail at a later point. Internally, insert 10 has threads 15, which are centered about the same axis 16 as are external threads 14, and into which a coacting externally threaded stud or bolt 17 is to be connected when the insert is in use. This bolt 17 may typically be utilized for holding a part 18 in position against the upper surface of carrier part 12, as is represented in FIG. 2.

Referring now to FIG. 5, inserts of the type shown in FIGS. 1 to 3 are formed very rapidly and simply from an elongated strip of conventional metal bar stock 19, of a type whose cross-section desirably takes the shape of a regular polygon. In the figures, I have represented a preferred arrangement in which the bar stock 19 is of six sided or hexagonal cross section, though it is to be understood that certain advantages of the present invention may be attained utilizing regular polygonal bar stock having 5 sides or 7 sides, instead of the illustrated 6 sides. It will of course also be understood that the cross sectional shape of the bar stock 19 should be uniform along the entire length of that stock, though the stock may if desired be given a twisted configuration as will be discussed in greater detail in connection with FIGS. 6 through 8. The six sides 28 of the bar stock should each be planar, for assuring optimum thread rolling characteristics in the instances in which the inserts of the present invention are to be utilized.

Starting with the polygonal stock 19 of FIG. 5, the first step in the manufacturing process may be to form the threads 14 on an end portion 20 of the bar stock, which portion corresponds in length to one of the inserts 10. This end portion 20 is ultimately cut off from the rest of the bar stock 19 by a transverse cut made at the point 21 represented in FIG. 5, to form one of the inserts 10. The internal threads 15 within the insert may be formed either before or after the cut is made at the point 21. Also, there should be formed at the opposite ends of the insert two frusto-conical chamfers 22 and 23, which may in some cases be identical, or may be slightly different as shown to serve somewhat different purposes at the axially inner and outer ends of the insert. In the particular construction illustrated in the drawing, the axially inner chamfer 22 is relatively large, to facilitate initial insertion of the insert into part 12, while chamfer 23 is smaller, to leave a transverse annular surface 24 at the axially outer end of the insert for engagement by a tool to be used in screwing the insert into bore 11.

All of the above discussed operations may if desired be performed on a screw machine, so that the machine may function very rapidly to successively produce a series of inserts 10 from the single length of bar stock 19. In many instances, however, it is felt preferable to perform all of these operations except the application of internal threads 15 on the screw machine, and then leave this internal threading operation for a subsequent step in a different machine. In this case, the external hexagonal configuration of the insert has proven extremely helpful, since such a hexagonal part can be easily inserted into and held effectively by a correspondingly shaped hexagonal tool chuck during the final internal threading operation.

The external threads 14 on insert 10 extend along the entire length of the insert, and may be conventional screw threads except insofar as they are truncated by virtue of the initial polygonal shape of the bar stock. To consider somewhat more specifically the shape of threads 14, disregarding for the moment the alteration in their shape resulting from the polygonal cross-section of the stock, threads 14 have a uniform major diameter represented at 25 in FIG. 2. Also, these threads have a uniform minor diameter 26, which is desirably somewhat modified as shown, to asure the provision of a maximum possible wall thickness in the insert. That is, between successive turns of the external threads 14, part 10 has a short cylindrical helically advancing surface 27.

In the optimum arrangement, the threads 14 may be so formed with relation to the dimensions of polygonal stock 19 that the minor diameter portions 27 of threads 14 are spaced a short distance radially inwardly of the planes of the flat sides 28 of the polygonal stock at the central portions 29 (see FIG. 3) of those flat sides. Stated differently, the radius of the minor diameter portions 27 of the threads 14 may be somewhat less than the radial distance H of each flat side 28 from axis 16 at the central portion 29 of that side. Also, the radial distance "C" between axis 16 and the corners or edges 30 of the polygonal stock 19 may be substantially equal to the radius of the major diameter portions 25 of the threads.

As a result of this manner of formation of insert 10, each of the individual turns of threads 14 forms a series of circularly spaced projections or peaks (see FIG. 3), which extend radially outwardly to the maximum diameter of the threads at a series of points 30. Between these projections, the flat sides 28 of the initial bar stock 19 truncate the threads to form planar outer surfaces of the type represented at 28a in FIGS. 1, 2 and 5. Each of these chord-like planar surfaces 28a, in extending from one of the projection points 30 to the next, first advances progressively radially inwardly to the intermediate point 29, and then advances progressively radially outwardly to the next projection location.

In using the insert represented at 10, a person merely screws the insert into the initially unthreaded bore 11, to form threads 31 in that bore, and to ultimately advance the insert 10 to the completely installed position of FIG. 2. Preferably, the cylindrical bore 11 initially provided in part 12 is of a diameter somewhat greater than the minimum diameter 26 of threads 14 on the insert. For example, the diameter of bore 11 may originally be that represented at "b" in FIG. 2. As insert 10 is screwed into the bore, the projections 30 on the insert act to progressively form threads 31 in the bore by a cold working operation, but do not perform a cutting operation, and therefore do not leave any cuttings on or in the parts. More specifically, the projections 30 of the threads force their way through the material of part 12, to form thread grooves corresponding approximately to the shape of threads 14, and the material displaced in forming these grooves is forced into the inter-thread spaces, to actually decrease the diameter of the bore 11 at those inter-thread locations to the minor diameter 26 of the threads. As each of the projections or peaks 30 advances through the material of part 12, one of the planar surfaces 28a at all times leads that projection 30, that is, moves through the material ahead of that projection, with the result that the surface 28a progressively cams or wedges the material radially outwardly toward the diameter of projection 30. In this way, the thread forming action is performed very smoothly, and in a wedging manner, to eliminate any possibility of actual cutting of the material of part 12, and to thus assure the formation of extremely strong threads as a result of the cold working operation.

After one of the projections 30 has moved circularly beyond a particular portion of the material of part 12, the inherent slight resilience of the metal or other material 12 will cause the material to return very slightly radially inwardly at a location circularly behind the projection. As a result, the peak portion of each of the projections 30 extends outwardly into the material of part 12 a slight distance radially beyond the rest of the thread groove. This is represented in FIG. 3, in which it is apparent that each of the projections 30 at its peak is embedded slightly within the material of part 12. This feature gives to the insert 10 a very effective self-locking action, since in order to unscrew the insert from its FIG. 3 position each of the projections 30 must move in a counter-clockwise direction, and yet in order to do so it must wedge some of the material directly ahead of it radially outwardly. Further, in attempting to turn the insert in a counter-clockwise direction in this manner, there is apparently a tendency for each of the projections 30 to accumulate a slight amount of the material of part 12 ahead of it, to further increase the resistance to an unscrewing motion. At any rate, it has definitely been proven that the insert represented in FIGS. 1 to 5 does have a very definite and very effective locking action, eliminating the necessity for the provision of any locking keys for securing it in the FIG. 2 position.

FIG. 4 represents the manner in which a leading one of the projections at locations 30 functions to deform the material of the part 12 during the thread forming operation. As is brought out clearly in this figure, the surface 28a is camming the material of part 12 radially outwardly toward the diameter of the peak 30. Also, the material of part 12 is returning to a slightly decreased diameter at 32 directly behind peak 30.

FIGS. 6 through 8 represent a slightly variational form of the invention, which is formed the same as that of FIGS. 1 through 5 except that the initial bar stock 33 is twisted before the individual inserts 34 are formed therefrom. The twisting operation may be performed as represented in FIG. 8, in which there is shown at 33 an elongated strip of bar stock which initially was of the straight polygonal cross-sectional configuration discussed in connection with stock 19 of the first form of the invention. This piece of bar stock 33 may be positioned within an elongated rigid tube 35 of a diameter only slightly larger than the size of stock 33, and with a first end of stock 33 being rigidly held in fixed position by a stationary chuck 36. The opposite end of bar stock 33 may be gripped by a second chuck 37, aligned with the first chuck, and this second chuck 37 may then be forcibly turned about the axis of the two chucks and about the axis of part 33, and through a sufficient angle to give part 33 a permanent twist of a predetermined helical pitch. This twist may, for example, correspond to a twist of between about 2 and 6 turns per foot, but depends on the bar size to a great extent.

After stock 33 has been given a permanent twist in this manner, and is in the condition represented in the upper portion of FIG. 6, this stock may then be placed in a screw machine, and may be threaded externally and internally, chamfered, and cut off in short lengths, in exactly the same manner discussed in connection with FIGS. 1 through 5. The ultimate insert 34 produced in this manner will then be substantially the same as the insert represented at 10, except that the projections or peaks 38 formed by each turn of the external thread 39 will be offset circularly a short distance with respect to the corresponding projections 38a formed by the next successive turn. Since the projections 38 and 38a of the various turns are in this way all offset circularly from one another, the insert of FIGS. 6 and 7 has a considerably greater resistance to being pulled directly axially outwardly from within a part into which it has been screwed, than does the insert of FIGS. 1 through 5. That is, in order to pull the insert of FIGS. 6 and 7 directly outwardly from within a part 12, it would be necessary for all of the projections 38 and 38a to tear their way outwardly through different portions of the material of part 12.

The self-tapping action of threads 39 in FIGS. 6 and 7 is of course substantially identical with the action attained in FIGS. 1 through 5. Similarly, the self-locking action of the second form of the invention is the same as in the first form.

It has been mentioned previously in this specification that the provision of an effective self-tapping insert of the present type requires the maintenance of at least one critical dimensional relationship, and preferably several such relationships. To bring out these relationships clearly, the form of the invention shown in FIGS. 9 and 10 has been illustrated in greatly enlarged form, so that the dimensions involved in the unique structural relationships could be illustrated in detail. FIG. 9 is an end view of the insert, which may be considered as identical with that of FIGS. 1 through 5, both in construction and manner of formation, except that in FIGS. 9 and 10 the six outermost peak portions or corners of the bar stock from which the insert 40 is made do not form completely sharp corners, but instead are flattened or cut off slightly so that the outwardly projecting peak portions of the external threads have small radially outwardly facing planar flats 30b at their apexes. In extending about axis 16b from one of the peaks 20b to the next successive peak, the individual radially outwardly facing outer surfaces 28b which truncate the external threads are planar, in correspondence with the configuration of surfaces 28a in FIGS. 1 through 5.

To now define the particular dimensions of the FIGS. 9 and 10 device which have proven critical, it is first of all noted in FIGS. 9 and 10 that radial distance from axis 16b to the outermost portions of peaks 30b is designated as C. The minimum radial distance from axis 16b to the planes of radially outwardly facing flat surfaces 28b is designated H, this dimension being measured along the line extending from axis 16b to the center of each surface 28b (and perpendicular to that surface). The letter W in FIG. 10 represents the radial wall thickness, radially of axis 16b, between the major diameter portions 41 of internal threads 15b and the minor diameter portions 42 of external threads 14b. The letter R represents the radius from axis 16b to the major diameter portions 41 of the internal threads, that is, R represents one-half of the major diameter of the internal threads.

Using the letter designation defined above, it is felt highly important for assuring provision of a properly operable insert structure, that the dimension designated R be equal to between 67% and 80% of the dimension designated H. Further, it is found desirable that dimension H be equal to between 86% and 92% of C, and that dimension W be equal to between about 15% and 26% of dimension C. These same preferred relationships also apply to the forms of the invention shown in FIGS. 1 through 8.

If the ratio of radius R to dimension H is unduly decreased, this necessarily results in an excessive reduction in diameter of any stud or tool which is connected into the internal threads, with a resultant tendency for breakage of that stud or tool as the insert is screwed into position, or under load forces subsequently encountered in use. If the ratio R over H is unduly increased, then the strength of the insert wall is reduced so much that this wall tends to break as the insert is screwed into position, or under the subsequent load forces. The same is true if W becomes too small. If the ratio H over C is too great, then the peaks of the external threads are not large enough to effectively grip the wall of bore 11 and retain the insert against removal from that bore. If H over C is too small, then the projections become so large that the insert can not be effectively screwed into the initially unthreaded bore.

FIG. 11 shows another form of the invention, which is essentially the same as that of FIGS. 9 and 10 except for the alteration of internal threads 15c to enable them to be engaged by a tool which is used in screwing the insert into a carrier part. More particularly, the inner bore within the insert is broached, before the insert is initially threaded, by a broaching tool of the regular polygonal cross-section represented by broken lines 45. The corners of this tool form a series of circularly spaced corner recesses 46 extending radially outwardly into threads 15c, but desirably not extending outwardly beyond the major diameter 41c of those threads. There are preferably the same number of internal recesses 46 as external peaks 30c, with the maximum diameter portions of the individual recesses being directly radially opposite the individual peaks. Recesses 46 continue axially through at least several turns of the internal threads, and may if desired continue through the entire axial extent of the insert.

In installing the device of FIG. 11, there is inserted axially into the device a driving tool having the regular polygonal (preferably hexagonal) external cross-section represented by broken line 45. The corners of this tool thus fit within recesses 46, so that the insert may be screwed into a carrier part by turning the tool.

I claim:

1. A threaded insert comprising an insert body adapted to the screwed into an opening in a carrier member, said body having external threads centered about a predetermined axis for engaging said member and continuing along substantially the entire axial extent of the insert, said body having internal threads for engaging a coacting stud or the like centered about said axis and extending along the major portion of the length of said insert and open for access from both ends of the insert, said external threads defining essentially a regular polygon to form a series of similar circularly successive outer surfaces on said external threads merging to define sharp radially outwardly projecting peaks at the junctures of said surfaces, individual ones of said outer surfaces each lying in a predetermined plane throughout substantially the entire extent of a particular surface from one peak to the next peak, the external threads being of maximum radial thickness at said peaks and being truncated progressively between said peaks by said outer planar surfaces so that as a particular thread extends circularly from one peak to the next the thread first reduces and then increases in radial thickness, said internal and external threads and said outer surfaces being so related that:

$R$=between 67% and 80% of $H$
$H$=between 86% and 92% of $C$, and
$W$=between 15% and 26% of $C$, where:

R is one-half of the major diameter of the internal threads,

H is the minimum radial distance from said axis to the planes of said outer planar surfaces, C is the radial distance from said axis to the outermost portions of said peaks, and W is the radial wall thickness dimension between the major diameter of said internal threads and the minor diameter of said external threads, said external threads having minor diameter surfaces between successive turns of said threads which extend substantially directly axially at a predetermined substantially uniform diameter which is inwardly of said planes of said outer surfaces of the threads, said body having tapering chamfer surfaces of circular cross section centered about said axis at both ends of the insert with said chamfer surfaces progressively truncating said peaked external threads at both ends of the insert to an extent greater than that to which the external threads are truncated by said outer surfaces intermediate said ends, said body having a generally transverse annular end surface at one end thereof.

2. A threaded insert as recited in claim 1, in which said body is twisted about said axis so that said peaks of an individual turn of said external threads are offset circularly with respect to the corresponding peaks of adjacent turns.

3. A threaded insert as recited in claim 1, in which said polygon is a regular hexagon.

4. A threaded insert comprising an insert body adapted to be screwed into an opening in a carrier member, said body having external threads centered about a predetermined axis for engaging said member and continuing along substantially the entire axial extent of the insert, said body having internal threads for engaging a coacting stud or the like centered about said axis and extending along the major portion of the length of said insert and open for access from both ends of the insert, said external threads defining essentially a regular polygon to form a series of similar circularly successive outer surfaces on said external threads merging into planar surfaces defining outwardly projecting peaks at the junctures of said outer surfaces, individual ones of said outer surfaces each lying in a predetermined plane throughout substantially the entire extent of a particular outer surface from one peak to the next peak, the external threads being of maximum radial thickness at said peaks and being truncated progressively between said peaks by said outer planar surfaces so that as a particular thread extends circularly from one peak to the next the thread first reduces and then increases in radial thickness, said internal and external threads and said outer surfaces being so related that:

$R$=between 67% and 80% of $H$
$H$=between 86% and 92% of $C$, and
$W$=between 15% and 26% of $C$ where:

R is one-half of the major diameter of the internal threads,

H is the minimum radial distance from said axis to the planes of said outer planar surfaces, C is the radial distance from said axis to the outermost portions of said peaks, and W is the radial wall thickness dimension between the major diameter of said internal threads and the minor diameter of said external threads, said external threads having minor diameter surfaces between successive turns of said threads which extend substantially directly axially at a predetermined substantially uniform diameter which is inwardly of said outer surfaces of the threads, said body having tapering chamfer surfaces of circular cross section centered about said axis at both ends of the insert with said chamfer surfaces progressively truncating said peaked external threads at both ends of the insert to an extent greater than that to which the external threads are truncated by said outer surfaces intermediate said ends, said body having a generally transverse annular end surface at one end thereof, and said internal threads having corner recesses extending radially outwardly thereinto at locations essentially radially opposite said peaks respectively for engagement with a non-circular tool to be used in screwing the element into said carrier member.

5. A threaded insert comprising an insert body adapted to be screwed into an opening in a carrier member, said body having external threads centered about a predetermined axis for engaging said member and continuing along substantially the entire axial extent of the insert, said body having internal threads for engaging a coacting stud or the like centered about said axis and extending along the major portion of the length of said insert and open for access from both ends of the insert, said external threads defining essentially a regular polygon to form a series of similar circularly successive outer surfaces on said external threads merging into planar surfaces defining radially outwardly projecting peaks at the junctures of said outer surfaces, individual ones of said outer surfaces each lying in a predetermined plane throughout substantially the entire extent of a particular outer surface from one peak to the next peak, the external threads being of maximum radial thickness at said peaks and being truncated progressively between said peaks by said outer planar surfaces so that as a particular thread extends circularly from one peak to the next the thread first reduces and then increases in radial thickness, said internal and external threads and said outer surfaces being so related that:

$R$ = between 67% and 80% of $H$
$H$ = between 86% and 92% of $C$, and
$W$ = between 15% and 26% of $C$, where:

R is one-half of the major diameter of the internal threads,

H is the minimum radial distance from said axis to the planes of said outer planar surfaces, C is the radial distance from said axis to the outermost portions of said peaks, and W is the radial wall thickness dimension between the major diameter of said internal threads and the minor diameter of said external threads, said external threads having minor diameter surfaces between succesive turns of said threads which extend substantially directly axially at a predetermined substantially uniform diameter which is inwardly of said planes of said outer surfaces of the threads, said body having tapering chamfer surfaces of circular cross section centered about said axis at both ends of the insert with said chamfer surfaces progressively truncating said peaked external threads at both ends of the insert to an extent greater than that to which the external threads are truncated by said outer surfaces intermediate said ends, said body having a generally transverse annular end surface at one end thereof.

References Cited in the file of this patent

UNITED STATES PATENTS

| | | |
|---|---|---|
| 1,144,425 | Meaker | June 29, 1915 |
| 2,352,982 | Tomalis | July 4, 1944 |
| 2,823,574 | Rosan | Feb. 18, 1958 |
| 2,873,641 | Evans | Feb. 17, 1959 |
| 3,081,808 | Rosan et al. | Mar. 9, 1963 |